(12) United States Patent
Smith

(10) Patent No.: US 9,497,227 B2
(45) Date of Patent: Nov. 15, 2016

(54) METHOD OF CONVEYING A LOCATION INFORMATION REPRESENTING A PHYSICAL LOCATION OF A FIRST COMMUNICATION DEVICE, A COMPUTER PROGRAM PRODUCT FOR EXECUTING THE METHOD, AND THE FIRST COMMUNICATION DEVICE FOR CONVEYING THE LOCATION INFORMATION

(71) Applicant: Unify GmbH & Co. KG, Munich (DE)

(72) Inventor: James Smith, Nottingham (GB)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/384,018

(22) PCT Filed: Dec. 19, 2012

(86) PCT No.: PCT/EP2012/005267
§ 371 (c)(1),
(2) Date: Sep. 9, 2014

(87) PCT Pub. No.: WO2014/094798
PCT Pub. Date: Jun. 26, 2014

(65) Prior Publication Data
US 2015/0288726 A1    Oct. 8, 2015

(51) Int. Cl.
H04L 12/66    (2006.01)
H04L 29/06    (2006.01)
H04L 29/08    (2006.01)

(52) U.S. Cl.
CPC ....... *H04L 65/1006* (2013.01); *H04L 65/1069* (2013.01); *H04L 65/1093* (2013.01); *H04L 67/18* (2013.01)

(58) Field of Classification Search
None
See application file for complete search history.

(56) References Cited

U.S. PATENT DOCUMENTS 8,281,355 B1 * 10/2012 Weaver ................ H04N 21/478
725/110
9,215,734 B2 * 12/2015 Bakker ............. H04M 3/42348
455/404.1
(Continued)

FOREIGN PATENT DOCUMENTS

CN    1585335 A    2/2005
CN    102511172 A    6/2012
(Continued)

OTHER PUBLICATIONS

Written Opinion of the International Searching Authority for PCT/EP2012/005267 dated Aug. 21, 2013 (Form PCT/ISA/237).
(Continued)

*Primary Examiner* — Anh-Vu Ly
(74) *Attorney, Agent, or Firm* — Buchanan Ingersoll & Rooney PC

(57) ABSTRACT

A method of conveying a location information (2) representing a physical location of a first communication device (D) from the first communication device (D) to a server (S) comprises sending a first invite message (12) of the server (S), the server (S) being triggered by a third communication device (C), to the first communication device (D) to invite the first communication device (D) to initiate a communication connection (26) to a second communication device (T), and sending an answer message (13) of the first communication device (D) in response to the first invite message (12) to the server (S), wherein the location information (2) is inserted in the answer message (13) for insertion in a second invite message (14) of the server (S) to the second
(Continued)

communication device (T) to invite the second communication device (T) to accept the communication connection (26).

16 Claims, 4 Drawing Sheets

(56) References Cited

U.S. PATENT DOCUMENTS

| | | | |
|---|---|---|---|
| 2004/0141594 A1* | 7/2004 | Brunson | H04L 12/58 379/88.12 |
| 2005/0044188 A1 | 2/2005 | Nakazawa et al. | |
| 2006/0274730 A1* | 12/2006 | Medlock | H04L 12/5695 370/352 |
| 2008/0037516 A1* | 2/2008 | Cai | H04M 7/003 370/352 |
| 2009/0052422 A1 | 2/2009 | Kim et al. | |
| 2009/0296688 A1 | 12/2009 | Bakker et al. | |
| 2010/0023627 A1* | 1/2010 | Froment | H04L 65/1006 709/228 |
| 2010/0074419 A1* | 3/2010 | Poremba | H04L 12/66 379/45 |
| 2010/0180039 A1 | 7/2010 | Oh et al. | |
| 2010/0246780 A1* | 9/2010 | Bakker | H04W 4/22 379/38 |
| 2010/0262699 A1* | 10/2010 | Bakker | H04L 65/1073 709/227 |
| 2010/0274908 A1 | 10/2010 | Koskelainen | |
| 2011/0026440 A1* | 2/2011 | Dunn | H04M 3/5116 370/259 |
| 2012/0059913 A1* | 3/2012 | Imbimbo | H04W 36/385 709/219 |
| 2012/0129508 A1* | 5/2012 | Gentry | H04M 3/42263 455/417 |
| 2012/0195196 A1* | 8/2012 | Ghai | H04W 28/24 370/235 |
| 2014/0094210 A1* | 4/2014 | Gellens | H04W 4/12 455/517 |
| 2015/0189615 A1* | 7/2015 | Rembarz | H04W 4/021 455/435.1 |
| 2015/0199650 A1 | 7/2015 | Shenoy et al. | |

FOREIGN PATENT DOCUMENTS

| | | |
|---|---|---|
| CN | 102739673 A | 10/2012 |
| EP | 2469894 A1 | 6/2012 |
| JP | 2005063371 A | 3/2005 |
| JP | 2008182612 A | 8/2008 |
| KR | 20110014694 A | 2/2011 |
| WO | 2012104792 A1 | 8/2012 |

OTHER PUBLICATIONS

International Search Report for PCT/EP2012/005267 dated Aug. 21, 2013 (Forms PCT/ISA/220, PCT/ISA/210).
Polk Cicso Systems, B. Rosen, J. Peterson, Neustar J., Location Conveyance for the Session Initiation Protocol; RFC6442.TXT, Internet Engineering Task Force, IETF; Standard, Internet Society (ISOC) 4, Rue Des Falaises Ch-1205, Geneva, Switzerland, Dec. 3, 2011, pp. 1-35.

* cited by examiner

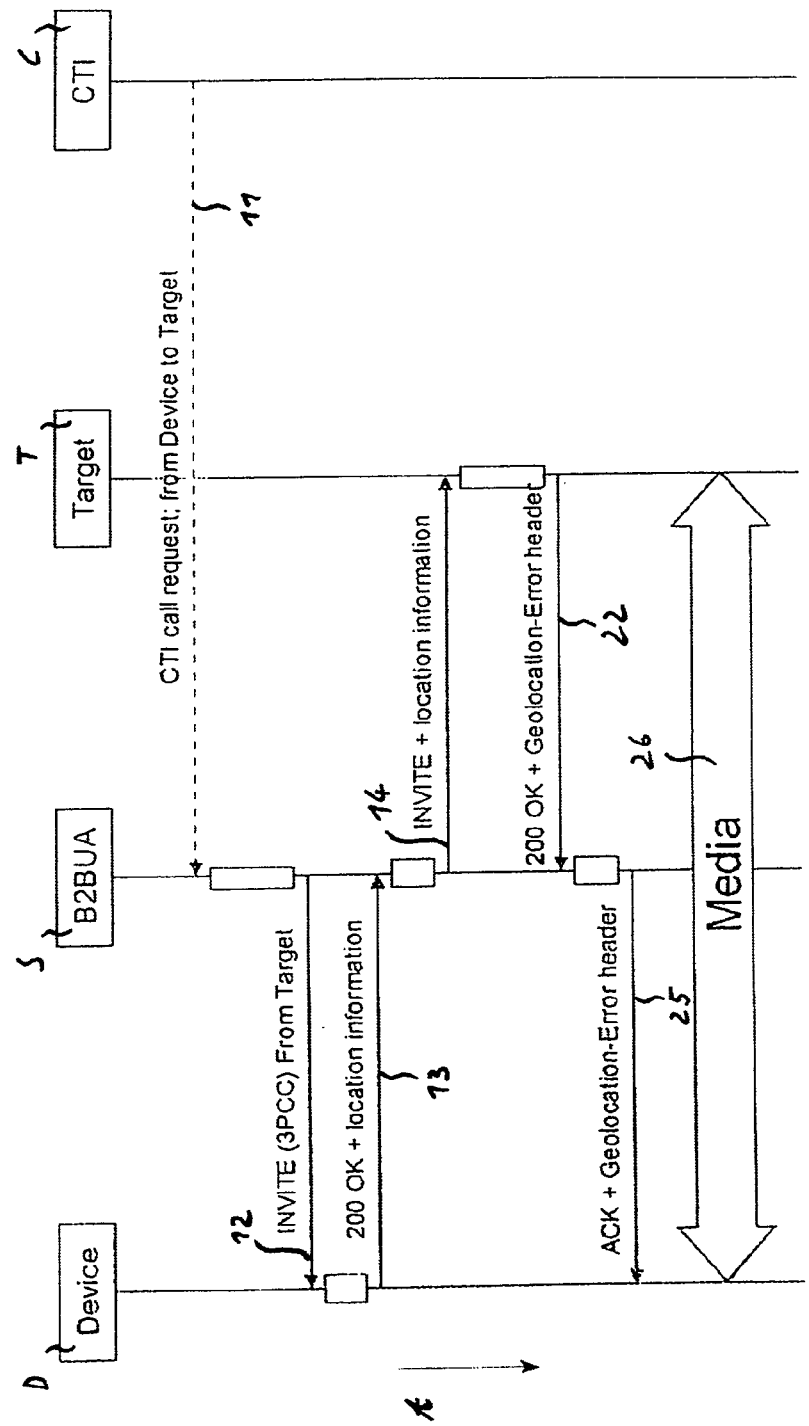

METHOD OF CONVEYING A LOCATION INFORMATION REPRESENTING A PHYSICAL LOCATION OF A FIRST COMMUNICATION DEVICE, A COMPUTER PROGRAM PRODUCT FOR EXECUTING THE METHOD, AND THE FIRST COMMUNICATION DEVICE FOR CONVEYING THE LOCATION INFORMATION

CROSS-REFERENCE TO RELATED APPLICATIONS

This application is the U.S. national stage under 35 U.S.C. §371 of PCT International Application No. PCT/EP2012/005267, filed on Dec. 19, 2012.

BACKGROUND OF THE INVENTION

1. Field of the Invention

Embodiments relate to a method of conveying a location information representing a physical location of a first communication device from the first communication device to a server. Embodiments further relate to a computer program product for executing such a method and to the first communication device for conveying the location information.

2. Background of the Related Art

A location information provided in an element of a device such as a communication device, e.g. a mobile or an IP phone, a PDA (Personal Digital Assistant), a tablet PC, laptop or a desktop PC, is defined to represent the physical location of the device. This location information may be used by emergency services as NG911 (Next Generation 9-1-1) or NG112 (Next Generation 1-1-2) to locate the device that initiated an emergency communication request. Such a location information may be expressed as a civic location, e.g. a postal address and/or as geospatial coordinates, e.g. a map location. The physical location of the device is required in order for a server, such as a telephony server, to locate a suitable emergency services number to be used to initiate a communication connection by placing a call (routing). When using the Session Initiation Protocol (SIP), it is possible for a communication device to convey its location information to the telephony server by sending a SIP request message to the server to request the initiation of a communication connection, i.e. a call, to the server.

Instead of a communication connection being negotiated and established between two parties, the communication device and the server, it is also possible to initiate a communication connection between a first communication device and a second communication device controlled by a third communication device. Typically this is unlikely to be a device that is involved in media communication but rather it is normally an entity that is dedicated to control functions and acts via a server that provides, e.g., SIP messaging. An example is a call centre application or a web server that presents a web page with a 'click to dial' option. As such the third communication device may by described as a CTI (Computer Telephony Integration) server that may be hosted as a stand-alone entity or embedded in another device such as a communication device. In the traditional telephony context, a Third Party Call Control, abbreviated as 3PCC, allows one entity, e.g. a user of the third communication device, to setup and manage a communication connection, a communication relationship or a telephone call between two or more other parties, e.g. between the first and second communication devices. Third Party Call Control is often used where an operator may create a call that connects two participants (of the first and second communication devices). The operator may be independent of the resulting call or be a participant in the call via the first, or second, communication device. 3PCC may also be used for conferencing services.

When using the SIP protocol, many SIP services are possible through 3PCC. These include the traditional ones on the PSTN (Public Switched Telephone Network) but also more recent ones such as Click-to-Dial, allowing a user to click on a webpage to speak to a customer service representative. The web server may then create a call between the user and the customer service representative. In this case, the user may operate the third communication device as the Third Party Call Controlling entity and the first communication device in form of the user's telephone at the same time. Such a 3PCC call may be established between two phones, a phone and an IP host, or between two IP hosts.

According to the standard RFC 3725 (Network Working Group, Request for Comments, April 2004), the communication connection in form of a call is generated by a Back-to-Back User Agent (B2BUA), which may be embodied in a server or SIP server at a request of a third party that is remote from the first communication device that the call is to be made from to a second communication device. Common CTI mechanisms that could be used by the remote party to request the SIP server to generate a call include TAPI (Telephony Application Programming Interface) and CSTA (Computer-Supported Telecommunications Applications).

According to the 3PCC scenario as defined in RFC 3725, at first the B2BUA sends a SIP invite request to the first communication device. Although this is an incoming SIP call request, the first communication device will recognize the SIP invite request as a 3PCC call and automatically answer the SIP invite request. Secondly, on being answered by the first communication device, the B2BUA completes the call between the first communication device and a second communication device by sending a SIP invite request to the destination in form of the second communication device as requested by the user of the third communication device. In this context, the standard according to RFC 6442 (Internet Engineering Task Force (IETF), Request for Comments, December 2011) for location conveyance which is not specific to the use of location information for emergency calls but allows for any possible use of location information by the location consumer (e.g. location tracking), does not provide a mechanism for a communication device to participate in a logically outgoing call via an incoming SIP invite request that is generated by a Third Party Call Control mechanism. The standardized approach only allows for location information which may be in the form of SIP headers and a PIDF-LO body (Presence Information Data Format-Location Object) being provided in SIP request messages but not in SIP responses.

The provision of location information only in SIP request messages and not in SIP responses generates a problem if a user initiates an emergency call via a CTI application where the SIP server utilizes 3PCC to generate the call. Although the user is clearly present at the first communication device since the call media is still connected via the device, the device is unable to convey its location since it is only able to respond to the SIP invite request coming in from the SIP server. In a SIP VoIP (Voice over Internet Protocol) environment, call media is defined as RTP (Real-Time Transport Protocol) packets that stream between the communication devices which may convey audio and/or video data where the SIP messaging is used to control the streaming of the RTP packets. Call media may hence be referred to as the payload of the respective communication device.

A possible approach to avoid this problem in the use of 3PCC to trigger an outgoing call is by modifying the first communication device to use a SIP mechanism to pass on a proprietary event package such as uaCSTA (user agent Computer Supported Telephony Applications) to request the first communication device to originate the call by itself instead by the SIP server or to use a non-SIP mechanism, e.g. HTTP (Hyper Text Transfer Protocol) to request the first communication device to originate the call to the second communication device. Another way to avoid the problem is to treat a location-aware communication device as being location-unaware leading to the location information to be provided by the server or by some other means. This alternative approach to the problem may not be as accurate as a location information conveyed by the communication device itself, especially if the device is a mobile device. A further alternative solution to the problem may be the use of the SIP request once the call is connected between the first and second communication devices to convey the location information of the first communication device to the second communication device. However, this may not be acceptable by some location consumer endpoints which require the location information to be provided with an incoming call to be presented.

BRIEF SUMMARY OF THE INVENTION

Embodiments may provide methods to convey accurate location information of a first communication device in a simple manner to a second communication device via a server controlled by a third party to initiate a communication connection between the communication devices.

A method of conveying a location information representing a physical location of a first communication device from the first communication device to a server comprises sending a first invite message of/from the server, the server being triggered by a third communication device, to the first communication device to invite the first communication device to initiate a communication connection to a second communication device and sending an answer message of/from the first communication device in response to the first invite message to the server, wherein the location information is inserted in the answer message for insertion in a second invite message of the server to the second communication device to invite the second communication device to accept the communication connection. The location information may be a value or a set of values related to a civic location or geospatial coordinates of a physical location. The civic location may be a postal address, wherein the geospatial coordinates may define a map location. The first and/or second and/or third communication devices may be a mobile or stationary unit capable of sending and/or receiving data over a communication connection, respectively. For example, each or several of these communication devices may be a mobile phone, an IP phone, a Personal Digital Assistant, a tablet PC, a laptop or the like. Embodiments of each or several of these communication devices in form of a stationary unit such as a desktop PC or a server may be possible as well. Therefore, the first communication device and the third communication device may be a single unit. In this case, a user of the first communication device and a user of the third communication device may be the same person.

BRIEF DESCRIPTION OF THE FIGURES

FIG. 4 shows another schematic view of messages between the entities of FIG. 2, wherein despite of an error specific to the location information of the device a call can proceed and a SIP ACK message is used to convey information about the error specific to the location information back to the device.

DETAILED DESCRIPTION OF THE INVENTION

Figure 1:
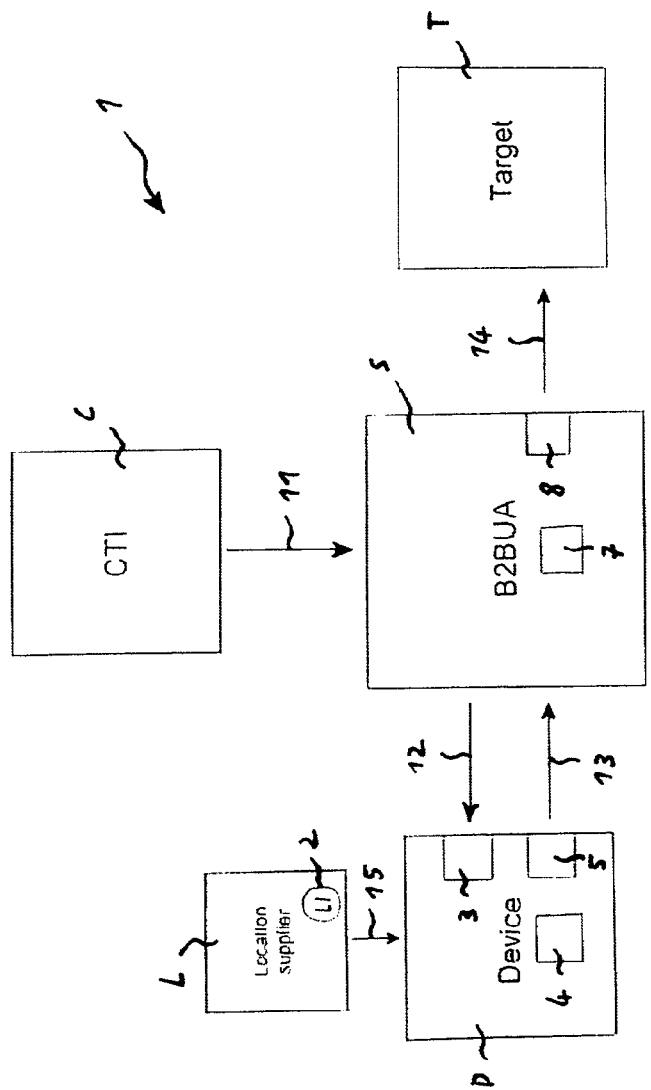
FIG. 1 shows a schematic communication system for providing location information of a first communication device via a server, which is triggered by a third communication device, to a second communication device.

The first invite message and/or the answer message and/or the second invite message may be messages of any protocol capable of being used in a third party control configuration, such as HTTP (Hypertext Transfer Protocol)/json (JavaScript Object Notation) or SIP. Other application layer protocols for call control like H.323, H.324, Skype, MGCP (Media-Gateway-Control-Protocol), RTCweb (Real Time Communication) etc. are also possible. The triggering of the server by the third communication device may occur by sending a trigger message from the third communication device to the server, the trigger message using a protocol which is the same as or different from that used by the first message and/or the answer message and/or the second invite message. The communication connection may be a call such as a phone call. The call may be controlled by a PSTN or by an IP host. Instead of a call where only audio data is being transferred, the communication connection may be used to transfer video data or other data related to any sort of media or application (e.g. file transfer). Therefore, in addition to a third party control of a call, the communication connection may be any connection from the first communication device to the second communication device which is triggered from the third communication device by using a server. The server may be a Back-to-Back User Agent in form of a SIP server. Other servers not using SIP, such as an HTTP-server, are possible.

The answer message of the first communication device is sent from the first communication device to the server in response to the first invite message to initiate the communication connection. The location information may be inserted in the answer message by the first communication device or by another entity such as a location supplying unit or an intermediate unit switched between the first communication device and the server. A location information is inserted in the answer message such that the inserted location information can be inserted in a second invite message of the server to the second communication device in order to invite the second communication device to accept the communication connection.

The location information is inserted in the answer message sent to the server in response to the first invite message. Therefore, additional messages for conveying the location information of the first communication device to the server are avoided, which would be required otherwise. Furthermore, the location information is not sent to the server before the first communication device receives the first invite message. Therefore recent location information is provided which is not older than and/or outdated than/with respect to location information being available for insertion in the answer message before the first invite message is received at the first communication device. Also, the server is not required to store possibly outdated location information of the first communication device as the location information is sent to the server in response to the first invite message. The insertion of the location information in the answer message such that the inserted location information can be inserted in a second invite message of the server to the second communication device ensures that for example the server is able to read the location information inserted in the answer message and to insert this location information in the second invite message to be sent to the second communication device. Therefore, additional messages to convey the location information inserted in the answer message from the server to the second communication device are avoided. Instead of a call where only audio data is being transferred, the communication connection may be used to transfer video data or other data related to any sort of media or application (file transfer). Therefore, in addition to third party call control, the communication connection may be any connection from the first communication device to the second communication device which is triggered from the third communication device by using a server. The server may be a Back-to-Back User Agent in form of a SIP server. Other servers not using the Session Initiation Protocol, such as an HTTP-server, are possible. Therefore, by inserting the location information of the first communication device in an answer message in response to a first invite message to a server such that the inserted location information can be inserted in a second invite message of the server to the second communication device allows for conveying the location information from the first to the second communication device via the server in an accurate and simple manner.

The location information may be conveyed from the server to the second communication device by sending the second invite message of the server to the second communication device, wherein the location information inserted in the answer message is inserted in the second invite message. In addition the server may perform such actions that are required to complete the location information such as consulting a LOST (Location-to-Service Translation) server. The location information inserted in the answer message may be inserted in the second invite message by the server or by another entity capable of retrieving the location information from the answer message and of inserting the inserted location information into the second invite message which is sent from the server to the second communication device. By sending a second invite message to the second communication device, the location information has been conveyed from the first communication device via the server to the second communication device.

The location information may be conveyed by using the Session Initiation Protocol, wherein the first communication device, the second communication device, optionally the third communication device, and the server are used in a Third Party Call Control configuration. A CTI server acting as the third communication device may use CSTA or TAPI rather than SIP or an alternative VOIP call control protocol. When using SIP, the standard RFC 6442 for location conveyance is relevant to the present invention since this standard defines the location conveyance via the Session Initiation Protocol in a Third Party Call Control configuration.

As the first invite message a 3PCC SIP invite request message and as the answer message a SIP 200 OK response message may be used. As outlined above, according to the standard RFC 6442 location information may only be provided in SIP request messages. Therefore, the insertion of location information in a SIP 200 OK response message to a SIP invite request message generated via 3PCC is not specified by the standard RFC 6442 or other standards known to the inventor. Since a server according to the standard RFC 6442 is not configured to retrieve location information from incoming SIP responses, the server according to the invention is enabled to retrieve the location information inserted in a SIP response message if the server is the entity retrieving the location information inserted in the answer message and inserting this location information in the second invite message. Therefore, if the server retrieves the inserted location information and inserts this information into the second invite message, it is configured to use the location information in the SIP 200 OK response message to add the location information in the SIP invite request message that is sent to the second communication device as the next step in the 3PCC configuration.

The location information may be inserted in the answer message in form of a location information header defined in the standard RFC 6442 and a PIDF-LO body. Other forms of location information, e.g. where the location information is inserted in the body or in the header of the answer message only, are possible. The location information header as defined in RFC 6442 and the PIDF-LO body may be not only inserted in the answer message but also in the second invite message. Different forms of location information in the answer message and the second invite message, respectively, are possible.

Whereas the insertion of location information in a SIP 200 OK response message to a SIP invite request message generated via 3PCC is not specified in any standard, the automatic answer of the first communication device to a SIP invite request message of the server in form of a SIP 200 OK response message is common knowledge as the standards that consider 3PCC, such as RFC 3725, depict a number of flow examples each with special usage of SDP (Session Description Protocol) negotiation to specify how the first communication device may detect that a received SIP invite request message represents a 3PCC action by the server to trigger an outgoing call. Furthermore, it is common practice to use a SIP alert info header to trigger the first communication device to automatically answer the 3PCC call with a SIP 200 OK response.

A SIP BYE message may be used to convey information about an error resulting from a location information inserted in the first invite message and/or the second invite message. The SIP BYE message may be sent by the server to the first communication device after reception of a SIP 424 response message sent by the second communication device to the server and may be used to convey information about an error resulting from the location information inserted in the second invite message. Alternatively, it may be sent due to a problem with the location information from the first communication device that is detected by the server, possibly in collaboration with a LOST server, before the second SIP invite is sent. If the error is such that a communication connection in the form of a call cannot proceed between the first and second communication devices then the standard according to RFC 3725 recommends that a SIP BYE request message is sent back to the first communication device. It is proposed that an error resulting from the location information or an error specific to the location information is reported in a SIP BYE message as a SIP BYE message is sent back to the first communication device anyway in case of a call which cannot proceed because of the error. The SIP BYE request message may thus comprise the location-specific SIP error code 424 as a SIP reason header and may additionally comprise the error reporting header and optional body as defined by the standard RFC 6442. With the information of an error resulting from the location information being reported to the first communication device, the first communication device is able to update the location information to be inserted in the next answer message in response to a next first invite message from the server. The provision of information of an error resulting from the location information or an error specific to the location information back to the first communication device, there is established an efficient feedback loop for updating false location information of the first communication device.

The SIP ACK message may be used to convey information about an error resulting from the location information inserted in the first invite message and/or the second invite message. The SIP ACK message may be sent by the server to the first communication device after reception of a SIP 200 OK response message sent by the second communication device to the server and may be used to convey information about an error resulting from the location information inserted in the second invite message. According to the standard RFC 6442 errors resulting from the location information in a SIP 200 OK response message back to the first communication device are reported in a SIP response message to an invite request message. However, between the first communication device and the server, the message flow is reserved and the server cannot send a SIP response message back for a SIP response message received from the first communication device. A next step in the SIP flow in a 3PCC configuration is for the server to send a SIP ACK request message back to the first communication device. It is proposed that the SIP ACK request message is used to provide the same location-specific error response header and optional body back to the first communication device. Since the SIP ACK request message contains an SDP body in the 3PCC scenario, the SIP ACK request message would also support a multi-part body similar to a normal SIP invite request which comprises both, SDP and location information. The message used to convey information about an error resulting from the location information inserted in the first invite message and/or the second invite message may comprise a Geolocation-Error header.

A computer program product for executing the inventive method as outlined above may be provided. The computer program product may be a software product comprising instructions. The computer program product may be comprised by a machine-readable medium wherein the machine-readable medium may be a floppy disk, a CD (Compact Disc), a DVD (Digital Versatile Disc) or any other suitable digital or analogue medium.

The invention further comprises a first communication device for conveying a location information representing a physical location of the first communication device from the first communication device to a server, wherein the first communication device comprises a reception unit configured to receive a first invite message sent by the server, the server being triggered by a third communication device, to the first communication device to invite the first communication device to initiate a communication connection to a second communication device, a first insertion unit configured to insert the location information in an answer message of the first communication device such that the location information may be inserted in a second invite message of the server to the second communication device to invite the second communication device to accept the communication connection, and a first sending unit configured to send the answer message in response to the first invite message to the server. The object of the invention is solved by this communication device for the same reasons as outlined above with respect to the inventive method. The communication device may be a mobile phone, a wired phone, such as an office phone, a PDA (Personal Digital Assistant), a PC (Personal Computer) or tablet PC or any other communication device comprising the apparatus features as outlined above. The location information may be provided by location sources such as a GPS transmitter (Global Positioning System), a DHCP (Dynamic Host Configuration Protocol) supporting server/switch, an LLDP-MED supporting LAN server/switch or an external configuration management system. LLDP-MED is the enhancement Media Endpoint Discovery of LLDP (Link Layer Discovery Protocol). LLDP-MED has been registered by the Internet Assigned Numbers Authority (IANA) as a valid value. The first insertion unit may be comprised by the first communication device as an internal unit or as an external unit connected to and accessed by the first communication device. The unit providing the location information may be comprised by the first communication device as an internal unit or as an external unit connected to the first communication device.

The invention further comprises a communication system comprising the first communication device as outlined above and the server, wherein the server comprises a second insertion unit configured to insert the location information inserted in the answer message in the second invite message, and a second sending unit configured to send the second invite message to the second communication device to convey the location information from the server to the second communication device. The second insertion unit may be in the form of a unit being integrated in the server or being a stand-alone unit connected to the server. The server may be a stand-alone unit or may be integrated in one or several of the first to third communication devices.

Further embodiments and advantages of the invention are highlighted in the following with respect to figures. For an improved clearness, the figures are not true to scale or proportionate. In the figures as long as not mentioned otherwise, same references indicate same parts with same meaning.

In FIG. 1, a communication system 1 for conveying a location information 2 of a first communication device in form of the device D from the device D to a second communication device in form of a target T via a server in form of a Back-to-Back User Agent (B2BUA) S which is triggered by a third communication device in form of a CTI source C. The B2BUA may be defined as an entity that logically embodies a receiving and a sending User Agent endpoint elements such that messages received from a source endpoint may be manipulated before they are passed on to the destination endpoint. The location information 2 may be in form of a civic location, e.g. a postal address and/or in the form of geospatial coordinates, e.g. a map location or address. The location information 2 is provided by a location supplier L. A location supplier may be a GPS sensor, an LLDP-MED (enabled LAN (Local Area Network)) switch or a configuration management system. The location supplier L may also be the device itself. If the device is a mobile phone, the location information of the device may be calculated by triangulation methods from the device itself by processing several signals of distant broadcasting antennas simultaneously received at the device. The location supplying unit L may therefore be an internal unit of the device D or an external unit as depicted in FIG. 1. The location information is transferred to the device D, 15, after a first invite message 12 has been received by the device D in a reception unit 3. The first invite message 12 is sent from the Back-to-Back User Agent S to the device D when the Back-to-Back User Agent S has been triggered by the CTI source C. The trigger action may be executed by sending a trigger message 11 from the CTI source C to the Back-to-Back User Agent S. A first insertion unit 4 is comprised by the device D and configured to insert the location information 2 in an answer message 13 to be sent from the device D to the Back-to-Back User Agent S. The first insertion unit 4 may be an internal part of the device D or an external part in form of a stand-alone unit connected to the device D. The location information is inserted by the first insertion unit into the answer message 13 such that the location information 2 may be inserted in the second invite message 14 to be sent from the server to the target T in order to invite the target T to accept a communication connection between the device D and the target T via the Back-to-Back User Agent S. A first sending unit 5 being part of the device D is configured to send the answer message 13 in response to the first invite message 12 to the Back-to-Back User Agent S. The CTI source C used to trigger/request the Back-to-Back User Agent S to initiate a communication connection in the form of a call may use any CTI protocol including TAPI and/or CSTA. The Back-to-Back User Agent S may utilise any application layer protocol that may be used for call control such as SIP or HTTP/json.

The communication connection between the device D and the target T may be used not only for transfer of audio data, but also for transfer of video data or any other data comprising information to be transferred from the device D to the target T, for instance files to be transferred. The Back-to-Back User Agent S comprises a second insertion unit configured to insert the location information 2 inserted in the answer message 13 in the second invite message 14 to be sent from the Back-to-Back User Agent S to the target T. The second insertion unit may be an integral part of the Back-to-Back User Agent S or an external part of the Back-to-Back User Agent S. Once the location information inserted in the answer message is inserted in the second invite message 14 by the second insertion unit 7, a second sending unit 8 configured to send the second invite message 14 to the target T sends the second invite message 14 to the target T to convey the location information 2 from the Back-to-Back User Agent S to the target T.

The location information 2 is inserted in the answer message 13 by the first insertion unit 4 such that the location information is insertable in the second invite message 14 of the Back-to-Back User Agent S to the target T to invite the target T to accept the communication connection. Therefore, the second insertion unit may retrieve the location information 2 inserted in the answer message 13 from the answer message 13 and may insert the inserted location information in the second invite message 14 afterwards. If the protocol used by the communication system 1 is the Session Initiation Protocol and if the CTI source C which may not use SIP to a B2BUA but rather use a CTI specific protocol such as CSTA, the Back-to-Back User Agent S, the device D, and the target T are operated by Third Party Call Control, the standard RFC 3725 is applicable to initiate a 3PCC call from the device D to the target T via the Back-to-Back User Agent S triggered by the CTI source C. Furthermore, when initiating a Third Party Call Control call via the Session Initiation Protocol, the standard for location conveyance RFC 6442 is applicable. According to this standard, location information in form of a SIP header and a PIDF-LO body are provided in SIP request messages only wherein SIP response messages are not suitable for providing location information. The first invite message 12 may be a 3PCC SIP invite request message sent from the Back-to-Back User Agent S to the device D. The answer message 13 may be a SIP 200 OK response message sent from the device D to the Back-to-Back User Agent S. Using the SIP 200 OK response message response to a 3PCC SIP invite request message has the advantages that the Back-to-Back User Agent S is allowed to obtain an accurate location information 2 from the device D itself without having to implement/utilize specialized CTI interfaces at the device D, and that problems are avoided for location information consuming devices such as the target T that require location information 2 when they first receive an incoming call via the second invite message 14 which may be a SIP invite request message comprising the location information 2.

Figure 2:
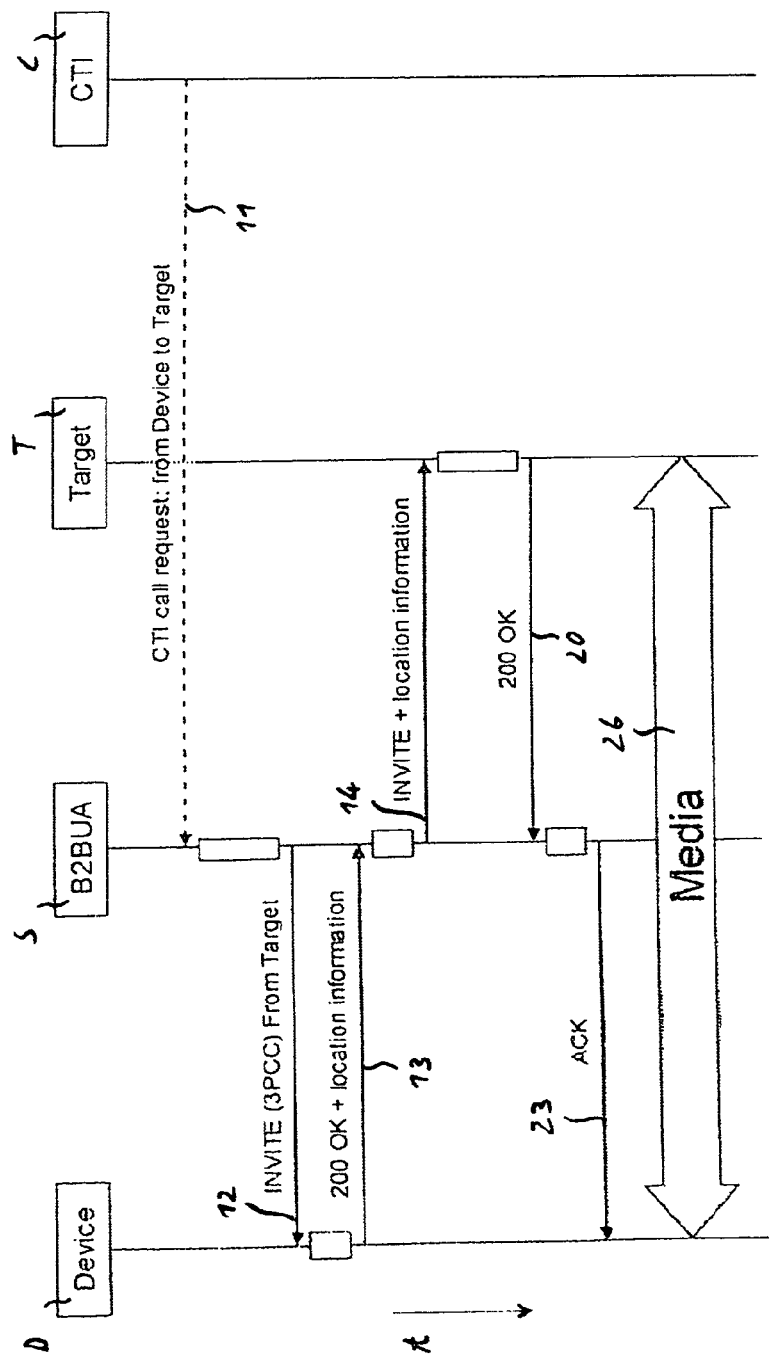
FIG. 2 shows a schematic flow of messages between a CTI source representing the third communication device, a Back-to-Back User Agent representing the server, a device representing the first communication device, and a target representing the second communication device, wherein a SIP 200 OK response message to an incoming 3PCC invite message is used to convey the location information of the device to the Back-to-Back User Agent for addition to an outgoing SIP invite message to the target.

In FIG. 2, a schematic flow of messages, which goes from the top to the bottom in terms of time as indicated by a vertical arrow t, according to the invention is depicted between the CTI source C, the Back-to-Back User Agent S, the device D, and the target, wherein a Third Party Call Control call is initiated as a communication connection between the device D and the target T by using the Session Initiation Protocol. As the case in the following figures, in FIG. 2 only the components relevant to the invention are depicted and neither the use of SDP negotiation nor the means by which the first invite request message 12 is determined to be a result of a Third Party Call Control action are indicated for simplicity reasons. The communication connection in the form of a call 26 and symbolized in FIG. 2 by the media to be transferred over the call 26, is initiated by the CTI source C that sends a CTI call request message 11 as a trigger message to the Back-to-Back User Agent S requesting a call from the device D to the target T. The device D determines that the received first invite message in form of a SIP invite request message 12 represents a Third Party Call Control call and that location information 2 should be provided for the call 26 to the target T. The answer message 13 in form of a SIP 200 OK response message sent by the device D to the Back-to-Back User Agent S comprises the same location headers and PIDF-LO body that the device D would have inserted if it had generated the SIP invite request message itself. The Back-to-Back User Agent S uses the location information 2 in the SIP 200 OK response 13 to generate a second invite message in form of an outgoing SIP invite request message 14 to the target T by inserting the location information 2 into the SIP invite request message 14. The target T accepts the call 26 and a media connection is established between the device D and the target T after a SIP 200 OK response message 20 has been sent from the target T to the Back-to-Back User Agent S and after a SIP ACK message 23 has been sent from the Back-to-Back User Agent S to the device D.

Figure 3:
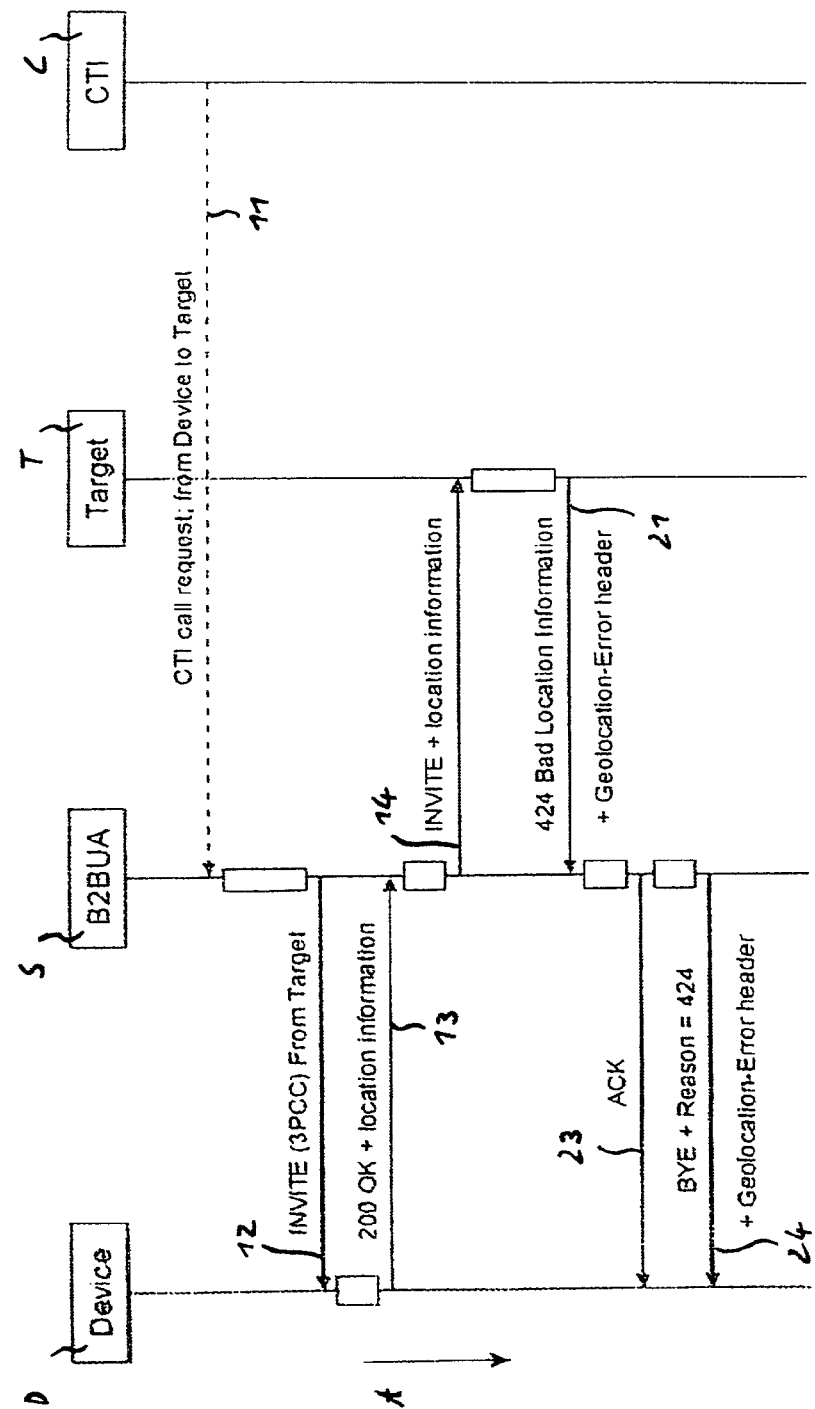
FIG. 3 shows a schematic flow of messages between the entities of FIG. 2 wherein because of an error specific to the location information of the device a call cannot proceed and a SIP BYE message is used to convey information about the error specific to the location information back to the device.

In FIG. 3, another schematic flow of messages according to the invention is shown, where the Session Initiation Protocol is used for a Third Party Call Control configuration between the CTI source C, the Back-to-Back User Agent S, the device D, and the target T, wherein a communication connection in form of a call cannot proceed because of an error specific to the location information 2. After triggering the Back-to-Back User Agent S by the CTI source C via sending a trigger message 11 in form of a CTI call request message for requesting a call between the device D and the target T, the Back-to-Back User Agent S sends a first invite message in form of a SIP invite request message 12 to the device D. The device D sends an answer message in form of a SIP 200 OK response message 13 in which the location information 2 has been inserted. Having inserted the location information 2 inserted in the answer message 13 into the second invite message in form of a SIP invite request message 14, after receiving this message 14 at the target T, it rejects the call due to problems with the location information 2. As a consequence, a SIP 424 response message 21 is sent from the target T to the Back-to-Back User Agent S wherein the SIP 424 response message comprises a Geolocation-Error header to define the reason of the failure to initiate the call requested by the CTI source. Once the Back-to-Back User Agent S has sent a SIP ACK request message to the device D to confirm the reception of the SIP 200 OK answer message from the device D, it then terminates the requested call by following the termination of the call with a SIP BYE (request) message which comprises a reason header that comprises the error code returned by the target T and comprises the Geolocation-Error header that the target T provided in its error response message 21. With the SIP BYE message comprising information about the error resulting from the location information 2 and leading to the call not being able to proceed at the target T, 24, the device D is able to process the error information comprised by the SIP BYE message 24 which indicates to the device D why the call failed.

In SIP protocol terms, the Back-to-Back User Agent S generates the SIP messages sent to the device D and to the target T. The Back-to-Back User Agent S may generate an error response message due to an error information that the Back-to-Back User Agent S receives from other entities in the call—such as the target T in the case depicted in FIG. 3. The target T detects an error which causes it to reject the call and the target T reports this error to the Back-to-Back User Agent S in its SIP response message 21 to the outgoing SIP invite request message 14 sent from the Back-to-Back User Agent S. The Back-to-Back User Agent S uses a SIP message in form of a SIP BYE message, which is different from the SIP invite request message 12, to report information about the error to the device D and to terminate the call that it had already set up for the device D. Equally the Back-to-Back User Agent S could itself detect a problem with the location information in the SIP 200 OK response message 13 sent from the device D which it would convey back to the device D with a SIP ACK message 23. Whilst the location error detected by the target T or by the B2BUA S may be conveyed in the SIP ACK message 23 it is preferred to always convey the error in the SIP BYE message 24 that is used to clear the call due to the error. So using the SIP BYE message to convey the error is the preferred embodiment. In this case, the call would be required to be terminated with a SIP BYE message 24 sent from the Back-to-Back User Agent S to the device D or the Back-to-Back User Agent S may be able to correct the problem with the inserted location information before it initiated the call to the target T by sending the second invite message in form of the SIP invite request message 14. In the latter case which is not depicted, the Back-to-Back User Agent S sends a SIP invite message to the target T, then receives a SIP 424 response message comprising a Geolocation-Error header from the target T, then sends another SIP invite message to the target T followed by a SIP 200 OK response message from the target T to the Back-to-Back User Agent S. After this the SIP ACK message may be sent from the Back-to-Back User Agent S to the device D.

In contrast to FIG. 3, in FIG. 4 a schematic flow of messages according to the invention between the CTI source C, the Back-to-Back User Agent S, the device D, and the target T is depicted, wherein the target T accepts the call 26 even though the target T detected a problem with the location information 2 received as inserted information in the second invite message 14 sent from the Back-to-Back User Agent S to the target T after receiving an answer message in form of a SIP 200 OK response message 13 wherein the location information 2 has been inserted in this message 13 by the device D in response to a first invite message sent from the Back-to-Back User Agent S to the device D in form of a SIP invite request message 12. Information about the location information error is reported back from the target T to the Back-to-Back User Agent S via a SIP 200 OK response message 22 comprising a Geolocation-Error header. The Back-to-Back User Agent S passes this header back to the device D by sending a SIP ACK request message 25 from the Back-to-Back User Agent S to the device D. Since the target T has indicated that it is able to proceed with the call 26 despite the problem with the location information, then a media connection is established between the device D and the target T.

Allowing a SIP ACK request message 25 or a SIP BYE request message 24 to convey information about location errors to the first communication device in form of the device D allows that the device D is informed of problems arising from the device D when providing location information 2 in response to a first invite message 12 when initiating a Third Party Call Control call. When using the standard RFC 6442 for location conveyance in a Third Party Call Control configuration using the Session Initiation Protocol, the location information is provided in SIP request messages only and not in SIP response messages. In contrast to the standard RFC 6442, it is suggested that location information is inserted in a response message from the first communication device in form of the device D to the server in the form of the Back-to-Back User Agent S. A SIP 200 OK response message in which location information has been inserted is ignored by a server in the form of a Back-to-Back User Agent S processing messages in conformity to the standard RFC 6442. As part of the invention, the server S is enabled to retrieve the location information inserted in the answer message in form of the SIP 200 OK response message and to insert the inserted location information into a second invite message in form of a SIP invite request message sent from the Back-to-Back User Agent S to the target T. To be in line with the present invention, a standard for location conveyance—in contrast to the standard RFC 6442—may define to provide location information not only in request messages but also in response messages. The advantages of the present invention to convey location information by insertion in invite and answer messages that are sent anyway between a first communication device and a second communication device via a server triggered by a third communication device are not only present when using SIP, but may be present when using another application layer protocol for call control such as HTTP/json, H.323, H.324, Skype, MGCP, RTCweb etc. Sending the location information after having received a first invite message at the first communication device to the server allows the server to obtain an accurate location information from the first communication device itself without having to implement/utilize additional interfaces at the first communication device. Sending the location information with the second invite message sent from the server to the second communication device avoids problems for the second communication device that may require the location information when first receiving an incoming call via reception of the second invite message. Sending information about an erroneous location information from the server to the first communication device in an acknowledgement message or in a final message before closing the call, enables the first communication device to detect why an error related to the location information inserted in the answer message of the first communication device could occur.

A technical feature or several technical features which has/have been disclosed with respect to a single or several embodiments disclosed herein before, e.g. using a CTI source C as the third communication device in FIGS. 1 to 4 may be present also in another embodiment e.g. using the HTTP protocol instead of the Session Initiation Protocol, except it is/they are specified not to be present or it is impossible for it/them to be present for technical reasons.

I claim:

1. A method of conveying a location information representing a physical location of a first communication device from the first communication device to a server, the method comprising:
   sending a first invite message of the server, after the server has been triggered by a third communication device, to the first communication device to invite the first communication device to initiate a communication connection to a second communication device, and
   sending an answer message of the first communication device in response to the first invite message to the server, wherein the location information is inserted in the answer message for insertion in a second invite message of the server to the second communication device to invite the second communication device to accept the communication connection;
   conveying the location information by using a Session Initiation Protocol (SIP), wherein the first communication device, the second communication device, the third communication device, and the server are used in a Third Party Call Control configuration; and
   conveying information about an error resulting from the location information inserted in at least one of the answer message and the second invite message through a SIP BYE message.

2. The method of claim 1, further comprising conveying the location information from the server to the second communication device by sending the second invite message of the server to the second communication device, wherein the location information inserted in the answer message is inserted in the second invite message.

3. The method of claim 1, wherein the first invite message is a 3PCC SIP INVITE request message and the answer message is a SIP 200 OK response message.

4. The method of claim 1, further comprising inserting the location information in a SIP INVITE request message used as the second invite message.

5. The method of claim 1, further comprising inserting the location information in the answer message in the form of a location information header defined in a standard RFC 6442 and a PIDF-LO body.

6. The method of claim 1, wherein the SIP BYE message is sent by the server to the first communication device after reception of a SIP 424 response message sent by the second communication device to the server to report an error resulting from the location information inserted in the second invite message.

7. The method of claim 1, wherein the SIP BYE message conveying information about the error resulting from the location information comprises a Geolocation-Error header.

8. The method of claim 1, comprising:
   inserting the location information in the second invite message by the server to send the second invite message to the second communication device to invite the second communication device to accept the communication connection with the first communication device.

9. The method of claim 1, comprising inserting the location information into the answer message by the first communication device prior to the first communication device sending the answer message to the server.

10. The method of claim 9, comprising:
    inserting the location information in the second invite message by the server after receiving the answer message from the first communication device;
    sending, by the server, the second invite message to the second communication device to invite the second communication device to accept the communication connection with the first communication device.

11. A method of conveying a location information representing a physical location of a first communication device from the first communication device to a server, the method comprising:
    sending a first invite message of the server, after the server has been triggered by a third communication device, to the first communication device to invite the first communication device to initiate a communication connection to a second communication device, and
    sending an answer message of the first communication device in response to the first invite message to the server, wherein the location information is inserted in the answer message for insertion in a second invite message of the server to the second communication device to invite the second communication device to accept the communication connection;
    conveying the location information by using a Session Initiation Protocol (SIP), wherein the first communication device, the second communication device, the third communication device, and the server are used in a Third Party Call Control configuration; and
    inserting information about an error resulting from the location information in at least one of the answer message and the second invite message through a SIP ACK message.

12. The method of claim 11, wherein the SIP ACK message is sent by the server to the first communication device after reception of a SIP 200 OK response message sent by the second communication device to the server to report an error resulting from the location information inserted in the second invite message.

13. A communication system comprising:
    a first communication device for conveying a location information representing a physical location of the first communication device from the first communication device to a server, the first communication device comprising:
a reception unit, a first insertion unit, and a first sending unit;
the first communication device configured to receive a first invite message sent by the server triggered by a third communication device to invite the first communication device to initiate a communication connection to a second communication device via the reception unit,
the first communication device configured to insert the location information in an answer message of the first communication device via the first insertion unit such that the location information is insertable in a second invite message of the server that is sendable to the second communication device to invite the second communication device to accept the communication connection, and
the first communication device configured to send the answer message in response to the first invite message to the server via the first sending unit;
the server comprising:
a second insertion unit and a second sending unit;
the server configured to insert the location information inserted in the answer message in the second invite message via the second insertion unit, and
the server configured to send the second invite message to the second communication device to convey the location information from the server to the second communication device via the second sending unit; and wherein the first communication device and the server have a Third Party Call Control configuration;
wherein the first communication device is configured to insert the location information in the answer message via Session Initiation Protocol (SIP); and
wherein the server is configured to insert information about an error resulting from the location information in the answer message through at last one of a SIP ACK message and an SIP BYE message that is sendable to the first communication device in response to determining that there is an error resulting from the location information in the answer message.

14. The communication system of claim 13, wherein the server is configured to determine that there is an error in the location information inserted in the answer message upon receipt of a SIP 424 response message sent by the second communication device in response to the second invite message.

15. The communication system of claim 14, wherein the server is configured to send the SIP BYE message to the first communication device in response to receiving the SIP 424 response message.

16. The communication system of claim 13, wherein the server is configured to determine that there is an error in the location information inserted in the answer message upon reception of a SIP 200 OK response message from the second communication device sent to the server in response to the second invite message that reports an error resulting from the location information inserted in the second invite message.

* * * * *